(12) United States Patent
Crombez

(10) Patent No.: US 6,267,456 B1
(45) Date of Patent: Jul. 31, 2001

(54) BRAKE MASTER CYLINDER AND PEDAL FEEL EMULATOR

(75) Inventor: Dale Scott Crombez, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/536,804

(22) Filed: Mar. 28, 2000

(51) Int. Cl.[7] .................................................. B60T 8/42
(52) U.S. Cl. ............................ 303/115.1; 60/591; 60/592
(58) Field of Search ........................... 303/114.2, 114.1, 303/115.2, 113.5, 113.1, 115.1, 3, 113.3; 60/533, 534, 540, 538, 545, 562, 567, 574, 581, 591, 592

(56) References Cited

U.S. PATENT DOCUMENTS

| | | | |
|---|---|---|---|
| 4,526,003 | * | 7/1985 | Leiber .................................. 60/534 |
| 4,655,511 | * | 4/1987 | Leiber .................................. 303/92 |
| 4,753,490 | * | 6/1988 | Belart et al. ....................... 303/114.1 |
| 4,802,712 | * | 2/1989 | Resch ................................. 303/114.1 |
| 5,253,929 | | 10/1993 | Ohori ...................................... 303/3 |
| 5,378,052 | | 1/1995 | Yoshino ................................... 303/3 |
| 5,421,643 | | 6/1995 | Kircher et al. .......................... 303/3 |
| 5,567,021 | | 10/1996 | Gaillard .................................. 303/3 |
| 5,729,979 | * | 3/1998 | Shaw et al. ............................ 60/533 |
| 5,749,633 | | 5/1998 | Baumgartner ..................... 303/113.1 |
| 5,927,825 | | 7/1999 | Schenk et al. ..................... 303/115.2 |
| 6,014,862 | * | 1/2000 | Shaw et al. ............................ 60/533 |
| 6,033,036 | * | 3/2000 | Ruffer et al. ....................... 303/114.1 |
| 6,192,685 | * | 2/2001 | Bourlon et al. ........................ 60/566 |

* cited by examiner

Primary Examiner—Robert J. Oberleitner
Assistant Examiner—Devon Kramer
(74) Attorney, Agent, or Firm—Gregory P. Brown; William J. Coughlin

(57) ABSTRACT

A master cylinder (12) and pedal feel emulator (10) useful in a brake-by-wire system. A bore (18) of the master cylinder contains three pistons (22, 34, and 28), in tandem, that divide the bore into various zones (26, 24, 32, 30). The emulator contains a piston (74) that divides a bore (72) into two zones (76, 78), and a spring (80) disposed in one of those zones. The zones of the emulator are hydraulically communicated in certain ways with zones of the master cylinder to enable the emulator to be effective during brake-by-wire controlled braking to displace the emulator piston to compress the emulator spring, thereby emulating pedal feel that occurs during hydraulic braking.

20 Claims, 3 Drawing Sheets

BRAKE MASTER CYLINDER AND PEDAL FEEL EMULATOR

BACKGROUND OF THE INVENTION

1. Field of the Invention

This invention relates generally to brake systems for wheeled motor vehicles, and more specifically it relates to a brake master cylinder and pedal feel emulator for a brake-by-wire system.

2. Background Information

Hydraulic-operated service brakes of a motor vehicle comprise a hydraulic master cylinder that is coupled via hydraulic brake lines to hydraulic wheel brakes at individual wheels. When a plunger of the master cylinder is depressed by a brake pedal to apply the wheel brakes, resistance is encountered. That resistance is typically due to a combination of the actual brake applications at the wheels and the force of a return spring acting on the pedal. Consequently, an operator of the vehicle expects to sense that resistance as a normal incident of driving.

A brake-by-wire system that utilizes a pedal to depress the master cylinder plunger performs the service brake function by selectively applying one of hydraulic brakes and brake-by-wire controlled brakes. Hydraulic brakes generally apply friction forces directly from the master cylinder to the wheels to dissipate energy as heat. Hydraulic brakes are typically used as a backup to brake-by wire controlled braking. Brake-by-wire controlled brakes generally are capable of applying friction forces to the wheels independent of the master cylinder displacement. Whether hydraulic or brake-by-wire controlled brakes are applied is determined by an electronic controller. Because flow of hydraulic fluid from the master cylinder to the wheel brakes is isolated from the friction brakes in brake-by-wire controlled braking when the controller determines that brake-by-wire controlled braking is to be applied, it may be considered desirable to associate an emulator with the master cylinder so that the feel sensed by the operator depressing the brake pedal is similar, and ideally identical, to the feel sensed when the hydraulic brakes are applied in a non-brake-by-wire braking system.

U.S. Pat. Nos. 5,729,979 and 5,927,825 disclose pedal feel emulators associated with master brake cylinders in brake-by-wire systems. Additional U.S. patents developed by a preliminary novelty search include: U.S. Pat. Nos. 4,526,003; 4,655,511; 5,253,929; 5,378,052; 5,421,643; 5,567,021; and 5,749,633.

SUMMARY OF THE INVENTION

The present invention relates to a novel association of a pedal feel emulator with a hydraulic brake master cylinder via hydraulic fluid paths that do not include an electric-actuated valve that is present at least in certain known brake systems. It is believed that the ability to eliminate such an electric-actuated valve is beneficial to overall system reliability. The association may be achieved by intimate integration of the emulator with the master cylinder, although generic principles of the invention contemplate a discrete emulator that can be mounted in a vehicle remote from the master cylinder.

One general aspect of the invention relates to a brake system for braking road-engaging wheels of a motor vehicle. The brake system comprises a brake master cylinder comprising a plunger adapted to be depressed within a bore of a master cylinder housing by operation of a brake pedal to brake the vehicle wheels. The bore comprises a first cylinder space within which a first piston, that divides the first cylinder space into a distal zone distal to a distal face of the first piston and a proximal zone proximal to a proximal face of the first piston, is displaced distally when the plunger is depressed. The bore further comprises a second cylinder space within which a second piston, that divides the second cylinder space into a distal zone distal to a distal face of the second piston and a proximal zone proximal to a proximal face of the second piston, is displaceable. A third piston that is disposed within the bore to isolate the distal zone of the first cylinder space from the proximal zone of the second cylinder space, and in response to distal displacement of the first piston, is displaced distally to impart distal displacement to the second piston when hydraulic-operated brakes for the vehicle wheels are applied.

A first reservoir port provides open fluid communication between the proximal zone of the first cylinder space and a hydraulic fluid reservoir, and a second reservoir port provides open fluid communication between the proximal zone of the second cylinder space and the hydraulic fluid reservoir. A first wheel brake port communicates the distal zone of the first cylinder space through a first normally open solenoid valve to at least a first hydraulic-operated brake for at least a first of the vehicle wheels, and a second wheel brake port communicates the distal zone of the second cylinder space through a second normally open solenoid valve to at least a second hydraulic-operated brake for at least a second of the vehicle wheels. Those two solenoid valves are open for hydraulic braking, but they are operated closed when brake-by-wire controlled braking is occurring.

In response to depression of the plunger coincident with disallowance of operation of the hydraulic-operated brakes caused by blockage of hydraulic fluid flow out of the master cylinder via the wheel brake ports, an emulator is effective to emulate resistance force encountered by depression of the plunger when the absence of such blockage causes the hydraulic-operated brakes to be applied.

The emulator comprises an emulator housing comprising an emulator cylinder space within which an emulator piston, that divides the emulator cylinder space into a distal zone distal to a distal face of the emulator piston and a proximal zone proximal to a proximal face of the emulator piston, is displaceable. The emulator further comprises a resiliently compressible element disposed in one of the zones of the emulator cylinder space for creating resistance force on the emulator piston in response to a change in volume of that one zone that occurs in response to displacement of the emulator piston within the emulator cylinder space. A first of the zones of the emulator cylinder space has open fluid communication with the distal zone of the first cylinder space, and a second of the zones of the emulator cylinder space has selective communication with the second reservoir port to allow open communication of the second zone of the emulator cylinder space with the second reservoir port, and hence cause the emulator piston to be displaced within the emulator cylinder space to compress the resiliently compressible element in consequence of depression of the plunger coincident with blockage of hydraulic fluid flow from the master cylinder via the wheel brake ports disallowing operation of the hydraulic-operated brakes, and to disallow communication of the second zone of the emulator cylinder space with the second reservoir port, and hence cause the emulator piston not to be displaced in consequence of depression of the plunger coincident with absence of such blockage.

Another general aspect of the invention relates to the master cylinder and emulator just described.

Still another aspect of the invention relates to the combination of a master cylinder and a pedal feel emulator for a motor vehicle that has multiple road-engaging wheels that are braked in consequence of a brake pedal depressing a plunger within a bore of a hydraulic master cylinder to cause a selected one of hydraulic brakes and brake-by-wire controlled brakes to be applied.

The master cylinder bore comprises a first cylinder space within which a first piston, that divides the first cylinder space into a distal zone distal to a distal face of the first piston and a proximal zone proximal to a proximal face of the first piston, is displaced distally when the a plunger is depressed, and a second cylinder space within which a second piston, that divides the second cylinder space into a distal zone distal to a distal face of the second piston and a proximal zone proximal to a proximal face of the second piston, is displaceable.

A third piston is disposed within the bore to isolate the distal zone of the first cylinder space from the proximal zone of the second cylinder space, and in response to distal displacement of the first piston, is displaced distally to impart distal displacement to the second piston when the hydraulic brakes are applied.

A first reservoir port provides open fluid communication between the proximal zone of the first cylinder space and a hydraulic fluid reservoir, and a second reservoir port provides open fluid communication between the proximal zone of the second cylinder space and the hydraulic fluid reservoir.

A first wheel brake port communicates the distal zone of the first cylinder space to the hydraulic brake for at least a first of the vehicle wheels, and a second wheel brake port communicates the distal zone of the second cylinder space to the hydraulic brake for at least a second of the vehicle wheels.

In response to depression of the plunger coincident with disallowance of operation of the hydraulic brakes caused by blockage of hydraulic fluid flow out of the master cylinder via the wheel brake ports, the emulator is effective to emulate resistance force encountered by depression of the plunger when the absence of such blockage allows operation of the hydraulic-operated brakes. The emulator comprises an emulator housing comprising an emulator cylinder space within which an emulator piston, that divides the emulator cylinder space into a distal zone distal to a distal face of the emulator piston and a proximal zone proximal to a proximal face of the emulator piston, is displaceable.

The emulator further comprises a resiliently compressible element disposed in one of the zones of the emulator cylinder space for creating resistance force on the emulator piston in response to a change in volume of that one zone that occurs in response to displacement of the emulator piston within the emulator cylinder space. A first of the zones of the emulator cylinder has open fluid communication with the distal zone of the first cylinder space, and a second of the zones of the emulator cylinder has selective communication with the reservoir controlled by a valve that is open when the third piston is not being displaced distally by the first piston, but that is forced closed by distal displacement of the third piston caused by distal displacement of the first piston.

Further aspects will be seen in various features of two presently preferred embodiments of the invention that will be described in detail.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
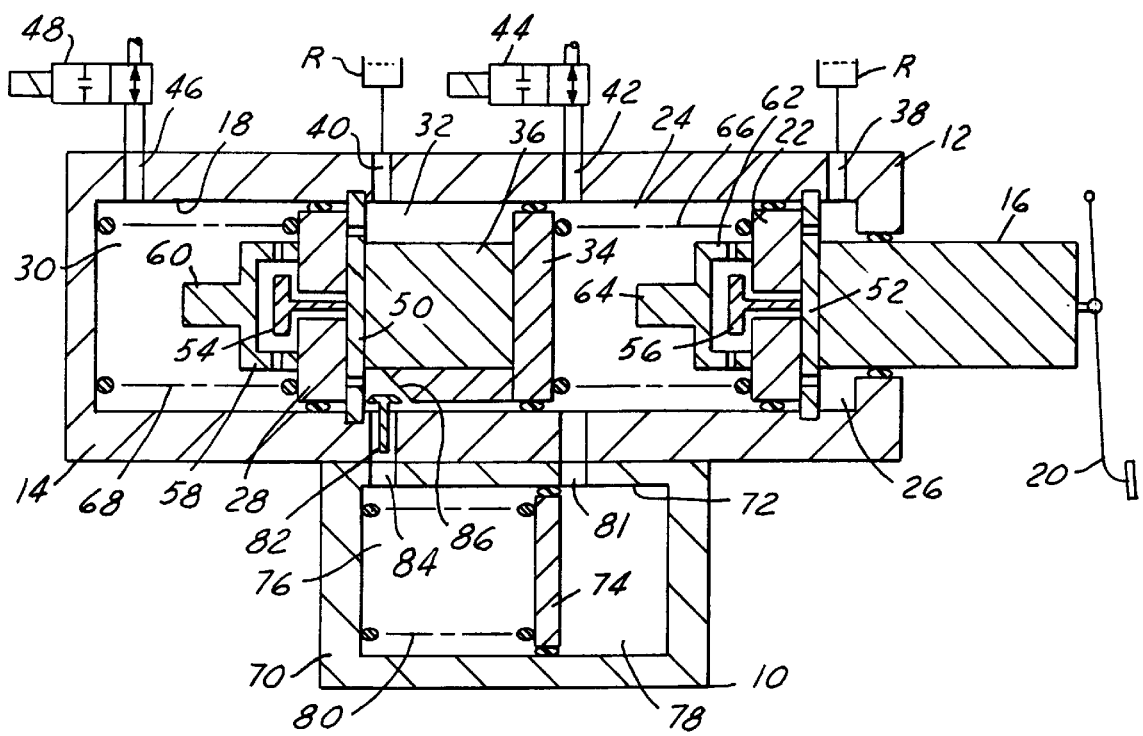
FIG. 1 is a view of a portion of an exemplary brake-by-wire system, including a longitudinal cross section view through a first embodiment of brake master cylinder and pedal feel emulator embodying principles of the present invention and showing a condition where the brake pedal is not being depressed.
Figure 2:
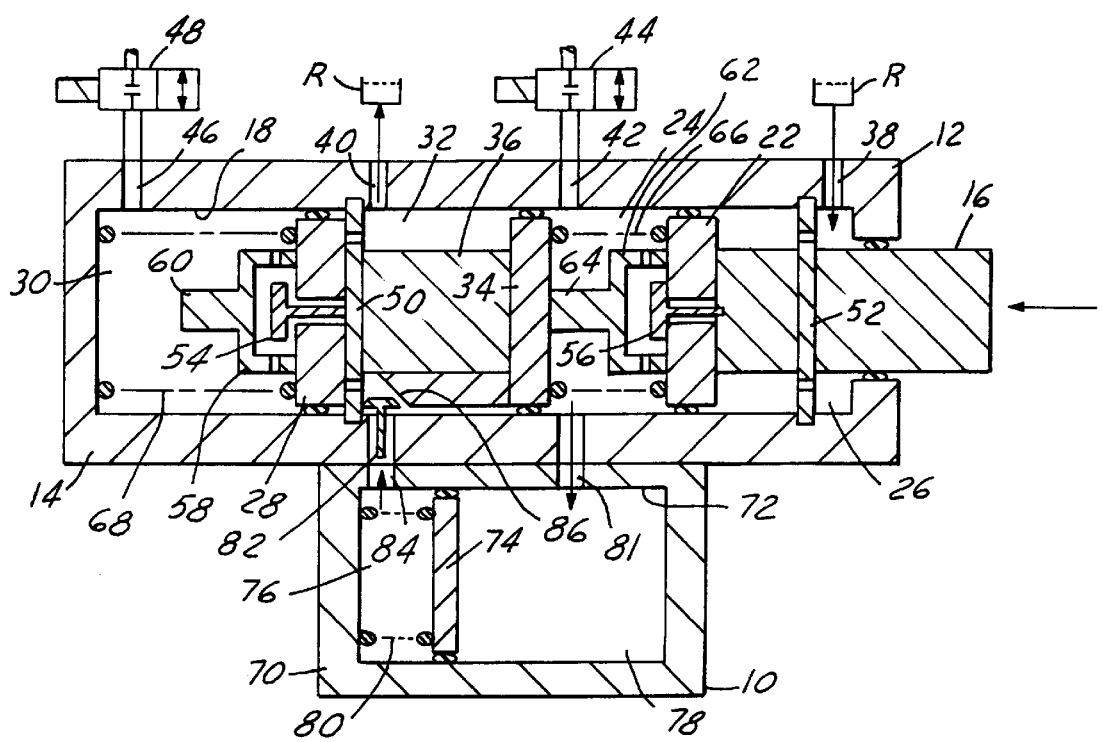
FIG. 2 is a view showing the first embodiment in a condition where the brake pedal is being depressed and only brake-by-wire braking is occurring.
Figure 3:
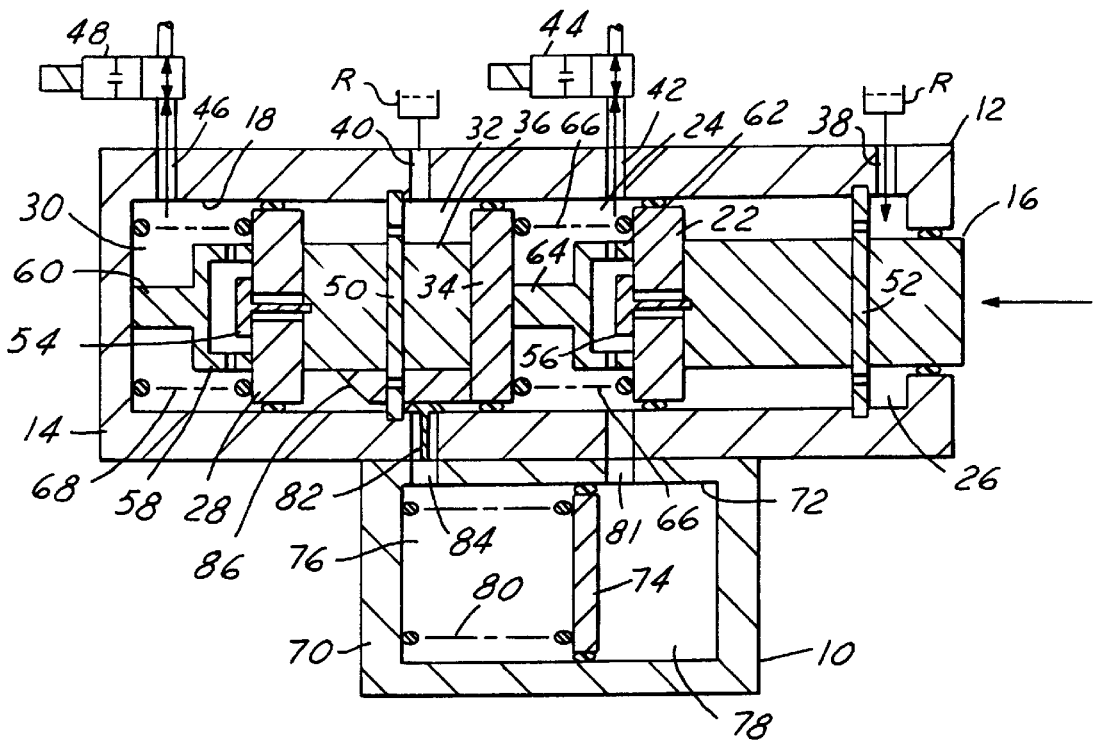
FIG. 3 is a view showing the first embodiment in a condition where the brake pedal is being depressed and only hydraulic braking is occurring.

FIGS. 1–3 show a pedal feel emulator 10 associated with a hydraulic brake master cylinder 12. Master cylinder 12 comprises a housing 14 and a plunger 16 which is adapted to be depressed within a bore 18 of housing 14 by operation of a brake pedal 20 to brake road-engaging wheels of a motor vehicle.

Bore 18 comprises a first cylinder space within which a first piston 22, that divides the first cylinder space into a distal zone 24 distal to a distal face of piston 22 and a proximal zone 26 proximal to a proximal face of piston 22, is displaced distally when plunger 16 is depressed. Piston 22 and plunger 16 are shown joined together for displacement in unison.

Bore 18 further comprises a second cylinder space in tandem with the first cylinder space. A second piston 28 is disposed in bore 18 for displacement within the second cylinder space and divides the second cylinder space into a distal zone 30 distal to a distal face of piston 28 and a proximal zone 32 proximal to a proximal face of piston 28.

A third piston 34 is disposed within bore 18 to isolate distal zone 24 of the first cylinder space from proximal zone 32 of the second cylinder space. Piston 34 is joined with piston 28 by a joining member 36 so that both pistons are displaced within bore 18 in unison. Each of the three pistons has a perimeter seal providing a sliding seal to the wall of bore 18. Where plunger 16 passes into bore 18, a surrounding wall of housing 14 contains a perimeter seal providing a fluid-tight sliding seal for plunger displacement relative to the housing.

A first reservoir port 38 in housing 14 provides open fluid communication between proximal zone 26 of the first cylinder space and a hydraulic fluid reservoir R that holds a supply of hydraulic fluid. A second reservoir port 40 in housing 14 provides open fluid communication between proximal zone 32 of the second cylinder space and reservoir R.

A first wheel brake port 42 communicates distal zone 24 of the first cylinder space to the hydraulic brake for at least a first of the vehicle wheels through a normally open solenoid valve 44. A second wheel brake port 46 communicates distal zone 30 of the second cylinder space to the hydraulic brake for at least a second of the vehicle wheels through a normally open solenoid valve 48.

Housing 14 is shown to comprise an apertured transverse wall 50 that is disposed to be abutted by piston 28 as shown in FIG. 1 for limiting proximal displacement of piston 28, and inherently that of piston 34 as well. A second apertured wall 52 does the same for piston 22 and plunger 16.

Piston 28 carries a pressure responsive valve 54 that allows hydraulic fluid flow from proximal zone 32 of the second cylinder space to distal zone 30 of the second cylinder space when hydraulic pressure in the former exceeds hydraulic pressure in the latter. Similarly, piston 22 carries a pressure responsive valve 56 that allows hydraulic fluid flow from proximal zone 26 of the first cylinder space to distal zone 24 of the first cylinder space when hydraulic pressure in the former exceeds hydraulic pressure in the latter.

An apertured cover 58 is disposed on the distal face of piston 28 in covering relation to valve 54. A post 60 projects distally from cover 58 and serves to limit distal displacement of piston 28, and inherently piston 34, by abutment with a distal end wall of housing 14, as portrayed by FIG. 3. An apertured cover 62 is disposed on the distal face of piston 22 in covering relation to valve 56. A post 64 projects distally from cover 62 and is disposed to abut the proximal face of piston 34 whenever plunger 16 is sufficiently depressed into housing 14 to cause such abutment to occur, as representatively portrayed by FIG. 2.

A helical coil compression spring 66 is disposed in distal zone 24 with its proximal end bearing against piston 22 and its distal end against piston 34. A helical coil compression spring 68 is disposed in distal zone 30 with its proximal end bearing against piston 28 and its distal end against the distal end wall of housing 14.

Emulator 10 comprises an emulator housing 70 which comprises a bore 72 that forms an emulator cylinder space. An emulator piston 74 divides the emulator cylinder space into a distal zone 76 distal to a distal face of emulator piston 74 and a proximal zone 78 proximal to a proximal face of piston 74. The emulator further comprises a resiliently compressible element 80, a helical coil spring for example, disposed in one of the zones of the emulator cylinder space, zone 76 in this embodiment. Element 80 serves to develop resistance force on emulator piston 74 in response to a change in volume of that one zone 76 that occurs in response to displacement of piston 74 within the emulator cylinder space. In this embodiment, that change in volume is a decrease in volume.

A first of the zones of the emulator cylinder space, zone 78 in this embodiment, has open fluid communication with distal zone 24 of the first cylinder space of master cylinder 12 via a passage 81, and a second of the zones of the emulator cylinder space, zone 76 in this instance, has selective communication with second reservoir port 40. This selective communication is provided by a valve 82 mounted in the wall of housing 14 to selectively open and close a passage 84 between zone 76 and zone 32. Piston 74 has a perimeter seal providing a sliding seal to the wall of bore 72.

Valve 82 is normally open, allowing flow through passage 84 when piston 34 is not being displaced distally by piston 22, as in FIGS. 1 and 2. Valve 82 is however forced closed by sufficient distal displacement of piston 34 by piston 22, as in FIG. 3. Valve 82 is operated from open condition to closed condition by a cam 86 that is displaced distally with distal displacement of piston 34.

When solenoid valves 44 and 48 are open, depression of plunger 16 by brake pedal 20 is effective to apply the hydraulic brakes. With plunger 16 not depressed as in FIG. 1, springs 68, 66 bias pistons 28, 34, 22 to their respective proximal limits of displacement. As plunger 16 is increasingly depressed, piston 22 is displaced distally to cause hydraulic fluid to pass from zone 24 through valve 44 to at least one of the wheel brakes. The displacement of piston 22 is also effective to begin to displace piston 34, and hence piston 28. Consequently, hydraulic fluid passes from zone 30 through valve 44 to at least another of the wheel brakes. The initial distal motion of cam 86 coincident with that of pistons 34, 28 forces valve 84 closed. To the extent that hydraulic pressure in zone 24 rises due to increasing application of the hydraulic brakes by plunger 16, the pressure in zone 78 of emulator 70 similarly increases, but the closed condition of valve 82 prohibits hydraulic fluid in zone 76 from escaping. Hence, piston 74 cannot be displaced to any significant extent within bore 72, and hence cannot impart any significant compression to emulator spring 80. As a result, the pedal feel sensed by a vehicle operator depressing pedal 20 is essentially uninfluenced by emulator 70, and the position of piston 74 will remain essentially unchanged over the full range of plunger depression extending to the full depression shown by FIG. 3.

When solenoid valves 44 and 48 are closed by a brake controller during brake-by-wire controlled braking, depression of plunger 16 by brake pedal 20 is ineffective to apply the hydraulic brakes. Emulator 70 however allows plunger depression with pedal feel that emulates the feel encountered when the hydraulic brakes are being applied. Plunger depression is effective to force hydraulic fluid from master cylinder zone 24 through passage 81 into emulator zone 78. Pistons 28, 34 cannot be displaced distally because hydraulic fluid in master cylinder zone 30 is trapped due to closure of valve 48. Hence, cam 86 cannot be displaced to close valve 84. Because valve 84 remains open, hydraulic fluid in zone 76 can pass through passage 84 into master cylinder zone 32 to displace fluid from the latter to reservoir R via port 40. Increasing depression of plunger 16 is therefore effective to displace emulator piston 74 in a sense that increasingly compresses spring 80. The force exerted by the compression of spring 80 imparts feel to pedal 20 emulating the feel that occurs when the hydraulic brakes are being applied. FIG. 2 shows maximum depression of plunger 16 limited by abutment of post 64 with piston 34, and corresponding maximum compression of emulator spring 80. When the pedal is released, springs 66 and 80 return their respective pistons 22 and 74 to the FIG. 1 condition.

Figure 4:
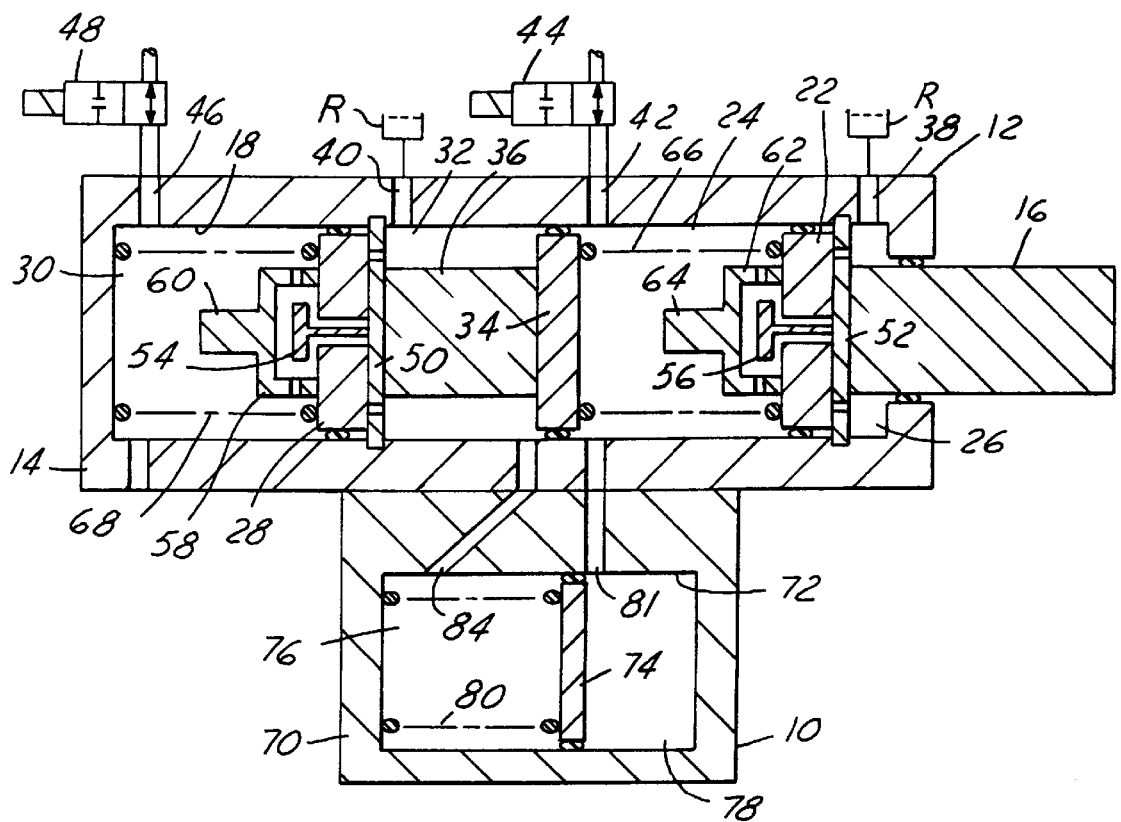
FIG. 4 is a view of a portion of an exemplary brake-by-wire system, including a longitudinal cross section view through a second embodiment of brake master cylinder and pedal feel emulator embodying principles of the present invention and showing a condition where the brake pedal is not being depressed.
Figure 5:
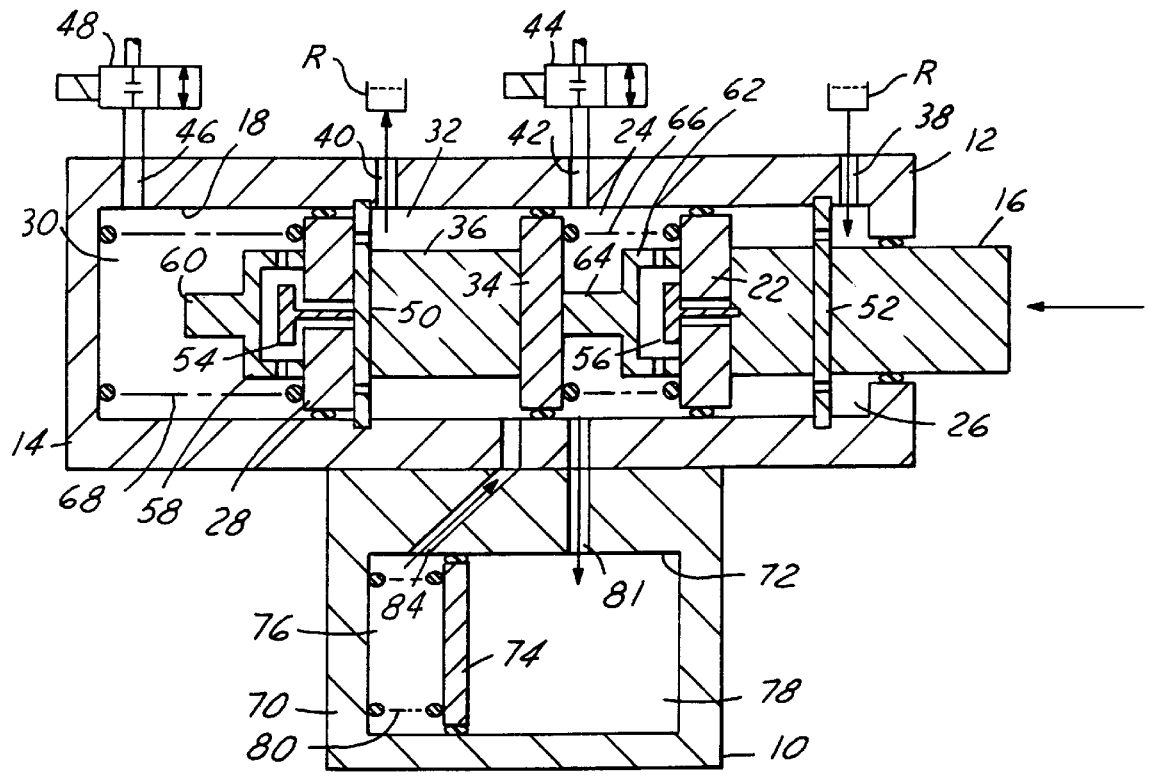
FIG. 5 is a view showing the second embodiment in a condition where the brake pedal is being depressed and only brake-by-wire braking is occurring.
Figure 6:
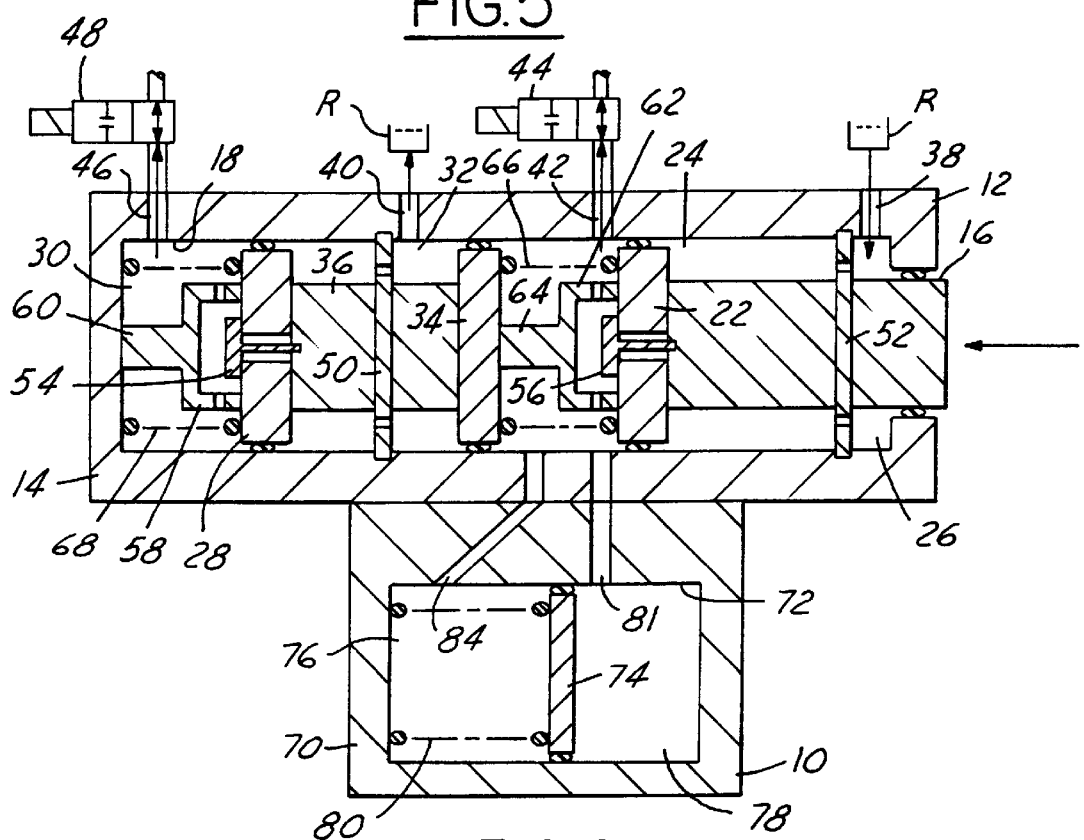
FIG. 6 is a view showing the second embodiment in a condition where the brake pedal is being depressed and only hydraulic braking is occurring.

The second embodiment shown in FIGS. 4–6 differs from the first in that valve 82 and cam 86 are omitted. The location at which passage 84 is open to master cylinder bore 18 is also different. Otherwise the two embodiments are similar, and like reference numerals will used to designate corresponding parts of the second embodiment without a repeated detailed description.

By communicating passage 84 to bore 18 at a location just distal to piston 34 when plunger 16 is not being depressed, piston 34 itself can perform a function equivalent to that of valve 82. With valves 44, 48 open, a certain amount of initial plunger depression will begin to cause displacement of piston 34. Before piston 34 begins to be displaced, passage 84 is open to master cylinder zone 32. A certain initial amount of displacement of piston 34 will cause passage 84 to be open to master cylinder zone 24 instead of zone 32. Once that happens, both passages 81, 84 are open to the same zone of the master cylinder, and so hydraulic pressures in the two emulator zones 76, 78 will be essentially equal. Hence emulator piston 74 cannot be displaced to any significant extent within bore 72, and hence cannot impart any significant compression to emulator spring 80. As a result, the pedal feel sensed by a vehicle operator depressing pedal 20 is essentially uninfluenced by emulator 70, and the position of piston 74 will remain essentially unchanged over the full range of plunger depression extending to the full depression shown by FIG. 6.

When solenoid valves 44 and 48 are closed by a brake controller during brake-by-wire controlled braking, depression of plunger 16 by brake pedal 20 is ineffective to apply the hydraulic brakes. Emulator 70 however allows plunger depression with pedal feel that emulates the feel encountered when the hydraulic brakes are being applied. Plunger depression is effective to force hydraulic fluid from master cylinder zone 24 through passage 81 into emulator zone 78. Pistons 28, 34 cannot be displaced distally because hydraulic fluid in master cylinder zone 30 is trapped due to closure of valve 48. Hence, passage 84 remains open to master cylinder zone 32, allowing hydraulic fluid in emulator zone 76 to pass through passage 84 into master cylinder zone 32 and displace fluid from the latter to reservoir R via port 40. Increasing depression of plunger 16 is therefore effective to displace emulator piston 74 in a sense that increasingly compresses spring 80. The force exerted by the compression of spring 80 imparts feel to pedal 20 emulating the feel that occurs when the hydraulic brakes are being applied. FIG. 5 shows maximum depression of plunger 16 limited by abutment of post 64 with piston 34, and corresponding maximum compression of emulator spring 80. When the pedal is released, springs 66 and 80 return their respective pistons 22 and 74 to the FIG. 1 condition.

Description of emulator operation was illustrated using a center valve/center valve (valve 54 and 56) type master cylinder. A more traditional type of master cylinder (not shown in any figures) eliminates the center valves. To provide the same function as a center valve, the ports 38 and 40 are moved distally relative to piston 22 and 28 respectively. As pistons 22 and 28 move distally, the seals move past port 38 and 40 (similar to the way piston 34 moves past port 84 in FIG. 6). Both types of master cylinders are common to automotive use although the center valve/center valve is required in many systems to prevent seal damage as the seals move past the ports. Both types of master cylinders may be used in implementation of the described emulator.

While a presently preferred embodiment has been illustrated and described, it is to be appreciated that the invention may be practiced in various forms within the scope of the following claims.

What is claimed is:

1. A brake system for braking road-engaging wheels of a motor vehicle, the brake system comprising:
a brake master cylinder comprising a plunger adapted to be depressed within a bore of a master cylinder housing by operation of a brake pedal to brake the vehicle wheels;
the bore comprising a first cylinder space within which a first piston, that divides the first cylinder space into a distal zone distal to a distal face of the first piston and a proximal zone proximal to a proximal face of the first piston, is displaced distally when the plunger is depressed, and a second cylinder space within which a second piston, that divides the second cylinder space into a distal zone distal to a distal face of the second piston and a proximal zone proximal to a proximal face of the second piston, is displaceable;
a third piston that is disposed within the bore to isolate the distal zone of the first cylinder space from the proximal zone of the second cylinder space and that, in response to distal displacement of the first piston, is displaced distally to impart distal displacement to the second piston when hydraulic-operated brakes for the vehicle wheels are applied;
a first reservoir port providing open fluid communication between the proximal zone of the first cylinder space and a hydraulic fluid reservoir;
a second reservoir port providing open fluid communication between the proximal zone of the second cylinder space and the hydraulic fluid reservoir;
a first wheel brake port for communicating the distal zone of the first cylinder space to at least a first hydraulic-operated brake for at least a first of the vehicle wheels;
a second wheel brake port for communicating the distal zone of the second cylinder space to at least a second hydraulic-operated brake for at least a second of the vehicle wheels;
and an emulator that, in response to depression of the plunger coincident with disallowance of operation of the hydraulic-operated brakes caused by blockage of hydraulic fluid flow out of the master cylinder via the wheel brake ports, is effective to emulate resistance force encountered by depression of the plunger when the absence of such blockage allows operation of the hydraulic-operated brakes; the emulator comprising an emulator housing comprising an emulator cylinder space within which an emulator piston, that divides the emulator cylinder space into a distal zone distal to a distal face of the emulator piston and a proximal zone proximal to a proximal face of the emulator piston, is displaceable;
the emulator further comprising a resiliently compressible element disposed in one of the zones of the emulator cylinder space for creating resistance force on the emulator piston in response to a change in volume of that one zone that occurs in response to displacement of the emulator piston within the emulator cylinder space;
a first of the zones of the emulator cylinder space having open fluid communication with the distal zone of the first cylinder space;
and a second of the zones of the emulator cylinder space having selective communication with the second reservoir port to allow open communication of the second zone of the emulator cylinder with the second reservoir port, and hence cause the emulator piston to be displaced within the emulator cylinder space to compress the resiliently compressible element in consequence of depression of the plunger coincident with blockage of hydraulic fluid flow from the master cylinder via the wheel brake ports disallowing operation of the hydraulic-operated brakes, and to disallow communication of the second zone of the emulator cylinder with the second reservoir port, and hence cause the emulator piston not to be displaced in consequence of depression of the plunger coincident with absence of such blockage.

2. A brake system as set forth in claim 1 in which the resiliently compressible element is disposed in the distal zone of the emulator cylinder space, and the piston is displaced distally within the emulator cylinder space to compress the element.

3. A brake system as set forth in claim 2 in which the element comprises a compression spring.

4. A brake system as set forth in claim 1 including a master cylinder compression spring that is disposed in the master cylinder bore between the first piston and the third piston, and the second piston and the third piston are joined together for displacement in unison within the bore.

5. A brake system as set forth in claim 1 in which the first piston carries a pressure responsive valve that allows hydraulic fluid flow from the proximal zone of the first cylinder space to the distal zone of the first cylinder space when hydraulic pressure in the former exceeds hydraulic pressure in the latter, and the second piston carries a pressure responsive valve that allows hydraulic fluid flow from the proximal zone of the second cylinder space to the distal zone of the second cylinder space when hydraulic pressure in the former exceeds hydraulic pressure in the latter.

6. A brake system as set forth in claim 1 in which a valve controls the selective communication of the second zone of the emulator cylinder with the second reservoir port.

7. A brake system as set forth in claim 6 in which the valve is operated from an open condition to a closed condition by distal displacement of the third piston in consequence of distal displacement of the first piston causing application of the hydraulic-operated brakes.

8. A brake system as set forth in claim 7 in which the valve is operated from open condition to closed condition by a cam that is displaced distally with distal displacement of the third piston.

9. A brake system as set forth in claim 7 in which the valve is mounted in a wall of the master cylinder housing.

10. A brake system as set forth in claim 1 in which the third piston controls the selective communication of the second zone of the emulator cylinder with the second reservoir port.

11. A brake system as set forth in claim 10 in which distal displacement of the third piston in consequence of distal displacement of the first piston causing application of the hydraulic-operated brakes causes communication of the second zone of the emulator cylinder to change from the proximal zone of the second cylinder space to the distal zone of the first cylinder space.

12. For a motor vehicle that has multiple road-engaging wheels that are braked in consequence of a brake pedal depressing a plunger within a bore of a hydraulic master cylinder to cause a selected one of hydraulic brakes and brake-by-wire controlled brakes to be applied, the combination of the master cylinder and a pedal feel emulator in which:

the master cylinder bore comprises a first cylinder space within which a first piston, that divides the first cylinder space into a distal zone distal to a distal face of the first piston and a proximal zone proximal to a proximal face of the first piston, is displaced distally when the plunger is depressed, and a second cylinder space within which a second piston, that divides the second cylinder space into a distal zone distal to a distal face of the second piston and a proximal zone proximal to a proximal face of the second piston, is displaceable;

a third piston that is disposed within the bore to isolate the distal zone of the first cylinder space from the proximal zone of the second cylinder space and that, in response to distal displacement of the first piston, is displaced distally to impart distal displacement to the second piston when the hydraulic brakes are applied;

a first reservoir port providing open fluid communication between the proximal zone of the first cylinder space and a hydraulic fluid reservoir;

a second reservoir port providing open fluid communication between the proximal zone of the second cylinder space and the hydraulic fluid reservoir;

a first wheel brake port for communicating the distal zone of the first cylinder space to the hydraulic brake for at least a first of the vehicle wheels;

a second wheel brake port for communicating the distal zone of the second cylinder space to the hydraulic brake for at least a second of the vehicle wheels;

and the emulator, in response to depression of the plunger coincident with disallowance of operation of the hydraulic brakes caused by blockage of hydraulic fluid flow out of the master cylinder via the wheel brake ports, is effective to emulate resistance force encountered by depression of the plunger when the absence of such blockage allows operation of the hydraulic-operated brakes;

the emulator comprising an emulator housing comprising an emulator cylinder space within which an emulator piston, that divides the emulator cylinder space into a distal zone distal to a distal face of the emulator piston and a proximal zone proximal to a proximal face of the emulator piston, is displaceable;

the emulator further comprising a resiliently compressible element disposed in one of the zones of the emulator cylinder space for creating resistance force on the emulator piston in response to a change in volume of that one zone that occurs in response to displacement of the emulator piston within the emulator cylinder space;

a first of the zones of the emulator cylinder having open fluid communication with the distal zone of the first cylinder space;

and a second of the zones of the emulator cylinder having selective communication with the second reservoir port to allow open communication of the second zone of the emulator cylinder with the second reservoir port, and hence cause the emulator piston to be displaced within the emulator cylinder space to compress the resiliently compressible element in consequence of depression of the plunger coincident with blockage of hydraulic fluid flow from the master cylinder via the wheel brake ports disallowing operation of the hydraulic brakes, and to disallow communication of the second zone of the emulator cylinder with the second reservoir port, and hence cause the emulator piston not to be displaced in consequence of depression of the plunger coincident with absence of such blockage.

13. A master cylinder and a pedal feel emulator combination as set forth in claim 12 in which a valve controls the selective communication of the second zone of the emulator cylinder with the second reservoir port.

14. A master cylinder and a pedal feel emulator combination as set forth in claim 13 in which the valve is operated from an open condition to a closed condition by distal displacement of the third piston in consequence of distal displacement of the first piston causing application of the hydraulic brakes.

15. A master cylinder and a pedal feel emulator combination as set forth in claim 14 in which the valve is operated from open condition to closed condition by a cam that is displaced distally with distal displacement of the third piston.

16. A master cylinder and a pedal feel emulator combination as set forth in claim 14 in which the valve is mounted in a wall of the master cylinder housing.

17. A master cylinder and a pedal feel emulator combination as set forth in claim 12 in which the third piston controls the selective communication of the second zone of the emulator cylinder with the second reservoir port.

18. For a motor vehicle that has multiple road-engaging wheels that are braked in consequence of a brake pedal depressing a plunger within a bore of a hydraulic s master cylinder to cause a selected one of hydraulic brakes and brake-by-wire controlled brakes to be applied, the combination of the master cylinder and a pedal feel emulator in which:

the master cylinder bore comprises a first cylinder space within which a first piston, that divides the first cylinder space into a distal zone distal to a distal face of the first piston and a proximal zone proximal to a proximal face of the first piston, is displaced distally when the plunger is depressed, and a second cylinder space within which a second piston, that divides the second cylinder space into a distal zone distal to a distal face of the second piston and a proximal zone proximal to a proximal face of the second piston, is displaceable;

a third piston that is disposed within the bore to isolate the distal zone of the first cylinder space from the proximal zone of the second cylinder space and that, in response to distal displacement of the first piston, is displaced distally to impart distal displacement to the second piston when the hydraulic brakes are applied;

a first reservoir port providing open fluid communication between the proximal zone of the first cylinder space and a hydraulic fluid reservoir;

a second reservoir port providing open fluid communication between the proximal zone of the second cylinder space and the hydraulic fluid reservoir;

a first wheel brake port for communicating the distal zone of the first cylinder space to the hydraulic brake for at least a first of the vehicle wheels;

a second wheel brake port for communicating the distal zone of the second cylinder space to the hydraulic brake for at least a second of the vehicle wheels;

and the emulator, in response to depression of the plunger coincident with disallowance of operation of the hydraulic brakes caused by blockage of hydraulic fluid flow out of the master cylinder via the wheel brake ports, is effective to emulate resistance force encountered by depression of the plunger when the absence of such blockage allows operation of the hydraulic-operated brakes;

the emulator comprising an emulator housing comprising an emulator cylinder space within which an emulator piston, that divides the emulator cylinder space into a distal zone distal to a distal face of the emulator piston and a proximal zone proximal to a proximal face of the emulator piston, is displaceable;

the emulator further comprising a resiliently compressible element disposed in one of the zones of the emulator cylinder space for creating resistance force on the emulator piston in response to a change in volume of that one zone that occurs in response to displacement of the emulator piston within the emulator cylinder space;

a first of the zones of the emulator cylinder having open fluid communication with the distal zone of the first cylinder space;

and a second of the zones of the emulator cylinder having selective communication with the reservoir controlled by a valve that is open when the third piston is not being displaced distally by the first piston, but that is forced closed by distal displacement of the third piston caused by distal displacement of the first piston.

19. A master cylinder and a pedal feel emulator combination as set forth in claim 18 in which the valve is mounted in a wall of the master cylinder housing.

20. A master cylinder and a pedal feel emulator combination as set forth in claim 19 in which the selective communication of the second zone of the emulator cylinder with the reservoir is through the proximal zone of the second cylinder space.

* * * * *